(12) United States Patent
Rangappa

(10) Patent No.: US 11,579,163 B1
(45) Date of Patent: Feb. 14, 2023

(54) DIFFERENTIAL PRESSURE ANGLE OF ATTACK SENSOR

(71) Applicant: Rockwell Collins, Inc., Cedar Rapids, IA (US)

(72) Inventor: Ravikumar Donkihalli Rangappa, Karnataka (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/474,672

(22) Filed: Sep. 14, 2021

(30) Foreign Application Priority Data

Jul. 29, 2021 (IN) ............................. 202141034179

(51) Int. Cl.
*G01P 13/02* (2006.01)
*G01P 5/165* (2006.01)

(52) U.S. Cl.
CPC ............ *G01P 13/025* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 4,378,696 A | 4/1983 | DeLeo et al. | |
| 5,438,865 A | 8/1995 | Greene | |
| 6,038,932 A | 3/2000 | Wandel et al. | |
| 6,227,918 B1 | 5/2001 | Wharton | |
| 6,813,942 B1 | 11/2004 | Vozhdaev et al. | |
| 8,695,412 B2 | 4/2014 | Mandle | |
| 10,048,288 B2 | 8/2018 | Benning | |
| 10,180,077 B2 | 1/2019 | Waddington | |
| 10,564,173 B2 | 2/2020 | Whalen et al. | |
| 11,029,326 B2 * | 6/2021 | Lang | B64F 5/60 |
| 2004/0261518 A1 * | 12/2004 | Seidel | B64D 43/02 73/182 |

(Continued)

FOREIGN PATENT DOCUMENTS

| | | |
|---|---|---|
| CN | 105021329 A | 11/2015 |
| DE | 3272657 D1 | 9/1986 |

(Continued)

OTHER PUBLICATIONS

Extended European Search Report in European Application No. 22186069.5 dated Nov. 25, 2022, 8 pages.

*Primary Examiner* — Peter J Macchiarolo
*Assistant Examiner* — Jermaine L Jenkins
(74) *Attorney, Agent, or Firm* — Suiter Swantz pc llo

(57) ABSTRACT

An angle of attack (AOA) sensor system is disclosed. The system comprises a plurality of pitot tube ports in a housing. The pitot tube ports include a set of positive angle pitot ports, a set of negative angle pitot ports, and a central pitot port. The central pitot port is aligned with a central chord line of a wing of the aircraft. A plurality of pitot tubes communicate with the plurality of pitot tube ports (at a first end), and with a plurality of pressure sensors (at a second end). A microcontroller is configured to generate a respective current AOA value for each pressure sensor based on a respective ram pressure measurement generated by each of the pressure sensors, and generate an AOA measurement of the aircraft by comparing each respective current AOA value to respective calibrated AOA values stored in a memory.

8 Claims, 5 Drawing Sheets

(56) References Cited

U.S. PATENT DOCUMENTS

| | | |
|---|---|---|
| 2013/0145836 A1 | 6/2013 | Mandle |
| 2016/0180611 A1* | 6/2016 | Cadotte ................. G01P 21/025 |
| | | 701/30.6 |
| 2017/0199218 A1* | 7/2017 | Benning ............... G01P 21/025 |
| 2019/0100327 A1 | 4/2019 | Krueger et al. |
| 2021/0096149 A1 | 4/2021 | Inman et al. |

FOREIGN PATENT DOCUMENTS

| | | |
|---|---|---|
| DE | 3888698 D1 | 4/1994 |
| DE | 60027552 T2 | 8/2000 |
| DE | 60228514 D1 | 9/2002 |
| EP | 1103803 B1 | 6/2006 |
| EP | 3104179 B1 | 4/2018 |
| GB | 560019 A | 3/1944 |
| GB | 1176381 A | 1/1970 |
| JP | H10332728 A | 12/1998 |
| JP | 2020090277 A | 6/2020 |

\* cited by examiner

DIFFERENTIAL PRESSURE ANGLE OF ATTACK SENSOR

CROSS-REFERENCE TO RELATED APPLICATION

The present application claims the benefit under 35 U.S.C. § 119(e) of Indian Provisional Application Serial Number 202141034179 filed Jul. 29, 2021, entitled DIFFERENTIAL PRESSURE ANGLE OF ATTACK SENSOR, naming Ravikumar Donkihalli Rangappa as inventor, which is incorporated herein by reference in the entirety.

SUMMARY

An angle of attack (AOA) sensor system is disclosed in accordance with one or more illustrative embodiments of the present disclosure. In one illustrative embodiment, the AOA sensor system comprises a housing attached, affixed or secured to an aircraft. In another illustrative embodiment, the system comprises a plurality of pitot tube ports in the housing, wherein the pitot tube ports include a set of positive angle pitot ports, a set of negative angle pitot tube ports, and a central pitot tube port, wherein the central pitot tube port is aligned with a central chord line of a wing of the aircraft. In another illustrative embodiment, the system comprises a plurality of pitot tubes, wherein each of the pitot tubes communicates at a first end with a respective one of the plurality of pitot tube ports. In another illustrative embodiment, the system comprises a plurality of pressure sensors, wherein each of the pitot tubes communicates at a second end with a respective one of the pressure sensors, wherein each of the pressure sensors comprises two metal plates and a conductive foam, wherein each of the pressure sensors generates a respective ram pressure measurement. In another illustrative embodiment, the system comprises a microcontroller communicatively coupled to the plurality of pressure sensors configured to: generate a respective current AOA value for each pressure sensor based on the respective ram pressure measurement generated by each of the pressure sensors; and generate an AOA measurement of the aircraft by comparing each respective current AOA value to respective calibrated AOA values stored in a memory.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
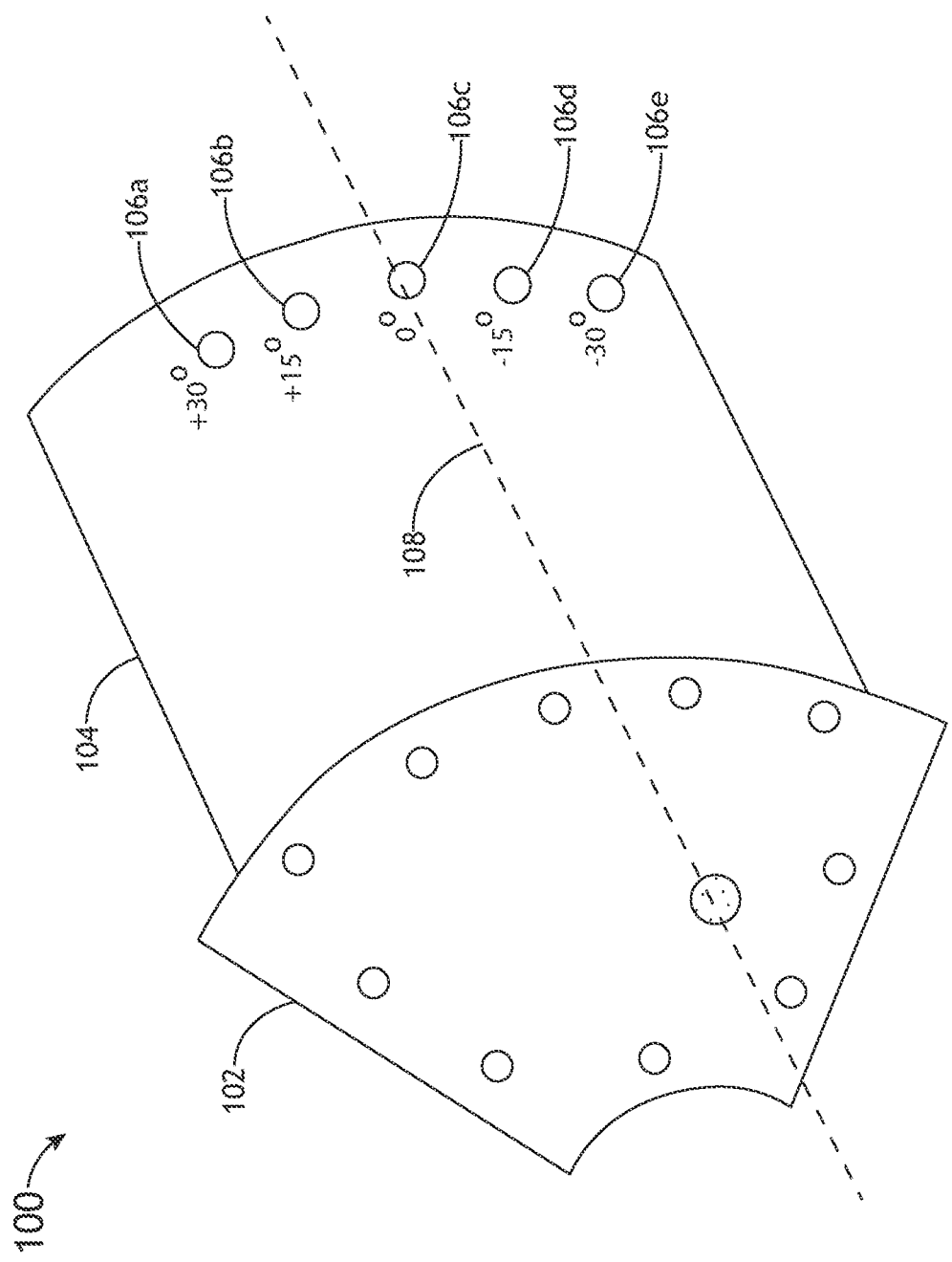
FIG. 1 is an isometric view of an AOA sensor system, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Accurate knowledge of the angle of attack (AOA) of an aircraft is critical to flight safety. In general, the true AOA of an aircraft wing cannot be known, and hence is measured using a sensor mounted on the aircraft. To increase effectiveness, the AOA sensor is usually mounted on the aircraft facing the free airstream to minimize fuselage flow effects. However, this location necessarily exposes the AOA sensor to severe environmental conditions experienced by the aircraft. Additionally, human errors can contribute considerably to externally mounted AOA sensor unreliability.

Common AOA sensing devices available on the market include vane and pressure based sensors. Although vane and pressure based AOA sensors are widely used on modern aircraft, these types of AOA sensors have construction, installation, testing, and calibration related issues that lead to inefficiency and unreliability.

Vane based sensors have complex designs that require specialists for maintenance, require complex calibration procedures for zero static friction to derive accurate AOA measurements, are effective only when measuring AOA during pitch movements of aircraft (e.g., not effective during cross-controlled stalling and banking), require wind tunnels to perform functionality tests (increasing expense and time to repair and re-calibrate to the expected design specifications), have moving parts with inertial effects that introduce inaccuracy and increase weight and response time, and are often damaged due to the force from water used to wash aircraft, bird hits, and mishandling by maintenance personnel.

Pressure based sensors are not effective at high AOAs (e.g., steep angles) as airflow stops impinging the probe nose, are not effective in sandy areas (since the ports get clogged), do not have ports aligned parallel to oncoming airflow (for accurate AOA measurements), do not consider air pressure on the calculation of AOA values, and do not consider different flap configurations on the calculation of AOA values (since the AOA changes depending on whether the flaps are deployed up or down). Thus, a device that improves the measurement of AOA on a fixed wing aircraft and solves the problems described above is desirable.

Embodiments of the present disclosure are directed to a pressure-based, fuselage-mounted, differential pressure AOA sensor system. The present AOA sensor system measures ram air pressure using pressure sensors attached to pitot tubes. The ram air pressure measured from each of the pressure sensors is then compared with preloaded calibrated AOA values derived from calibrating the pressure sensors to generate an accurate current AOA measurement of the aircraft.

FIG. 1 is an isometric view of an AOA sensor system 100, in accordance with one or more embodiments of the present disclosure. The AOA sensor system 100 includes a housing 104 and a mounting flange 102 configured to attach the sensor system 100 to an aircraft (e.g., at the fuselage). The system 100 includes a plurality of pitot tube ports 106a-e (e.g., holes or apertures in the housing 104). Although five ports 106a-e (corresponding to five pressure sensors) are shown in FIG. 1, the present disclosure is not limited thereto and the system 100 may include a greater or lesser number of ports 106a-e.

The ram air pressure of aircraft (e.g., from relative wind) may be measured through the five pitot tube ports 106a-e positioned at the −30°, −15°, 0°, +15°, +30° angular positions. The pitot tube ports 106a-e may be manufactured by, for example, drilling in the housing 104. The central pitot tube port 106c at 0° may be positioned parallel to a central chord-line of the aircraft wing (e.g., a wing having a +30° and −30° operating range), and may be used as a reference when installing the positive angle pitot tube ports 106a-b (above the 0° wing chord line) and the negative angle pitot tube ports 106d-e (below the 0° wing chord line).

Figure 2:
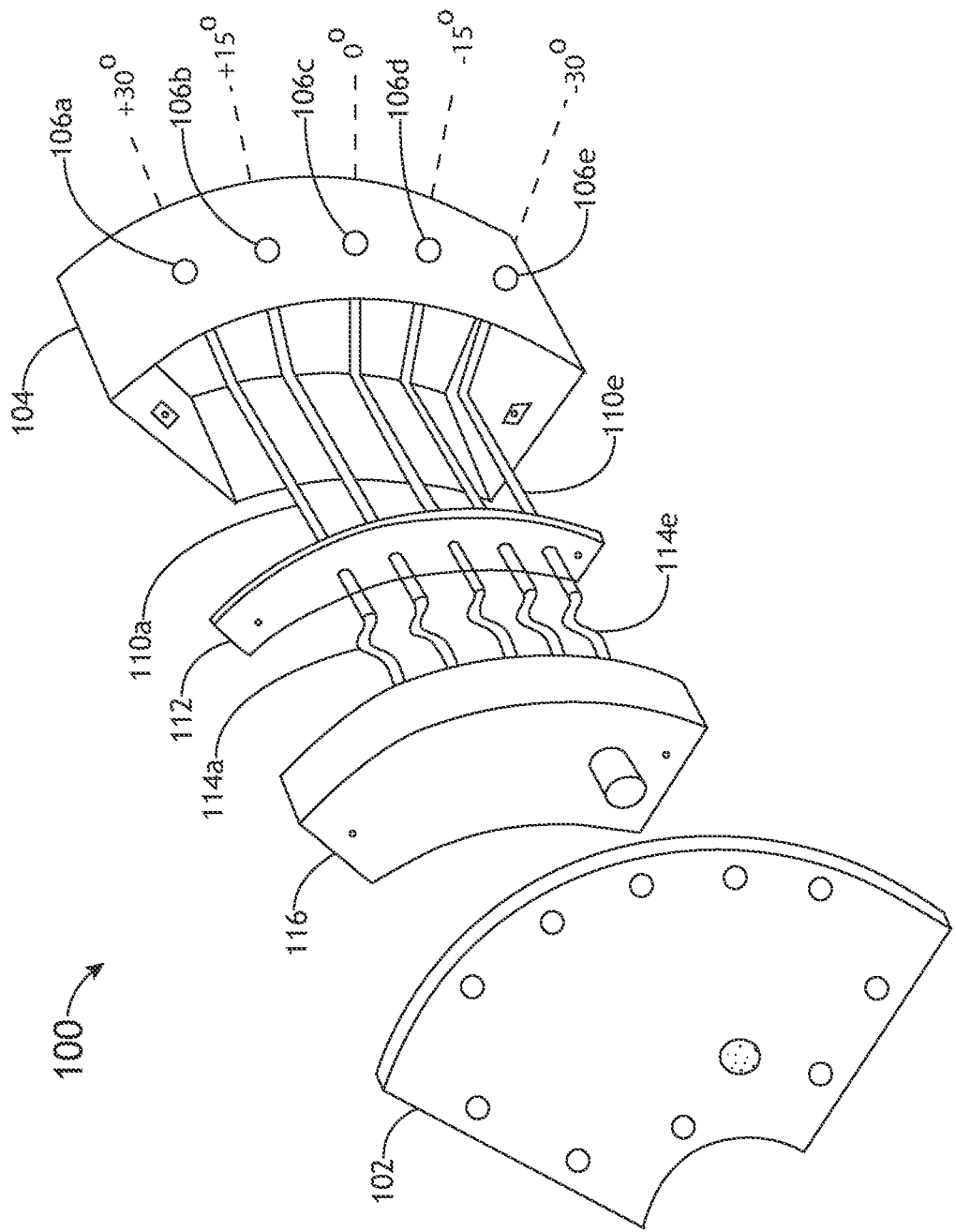
FIG. 2 is an isometric view of an AOA sensor system in disassembled form, in accordance with one or more embodiments of the present disclosure.

FIG. 2 is an isometric view of the AOA sensor system 100 in a disassembled form, in accordance with one or more embodiments of the present disclosure. Pitot tubes 110a-e may be connected at one end to the respective pitot tube ports 106a-e so that the port portion of each of the pitot tubes 110a-e is exposed to the atmosphere. The positive angle pitot tubes 110a and 110b may be positioned at the +15° and +30° angular positions with respect to the central pitot tube 110c (at the 0° angular position) to measure the upper AOA values. The negative angle pitot tubes 110d and 110e may be positioned at the −15° and −30° angular positions with respect to the central pitot tube 110c (at the 0° angular position) to measure the lower AOA values. A support bracket 112 may support and hold the pitot tubes 110a-e such that the pitot tubes 110a-e remain at the correct angle. The other end of each of the pitot tubes 110a-e may be respectively connected to electro-conductive type pressure sensors installed in an air data monitoring device (ADMD) 116 using respective polyurethane tubes 114a-e.

Figure 3:
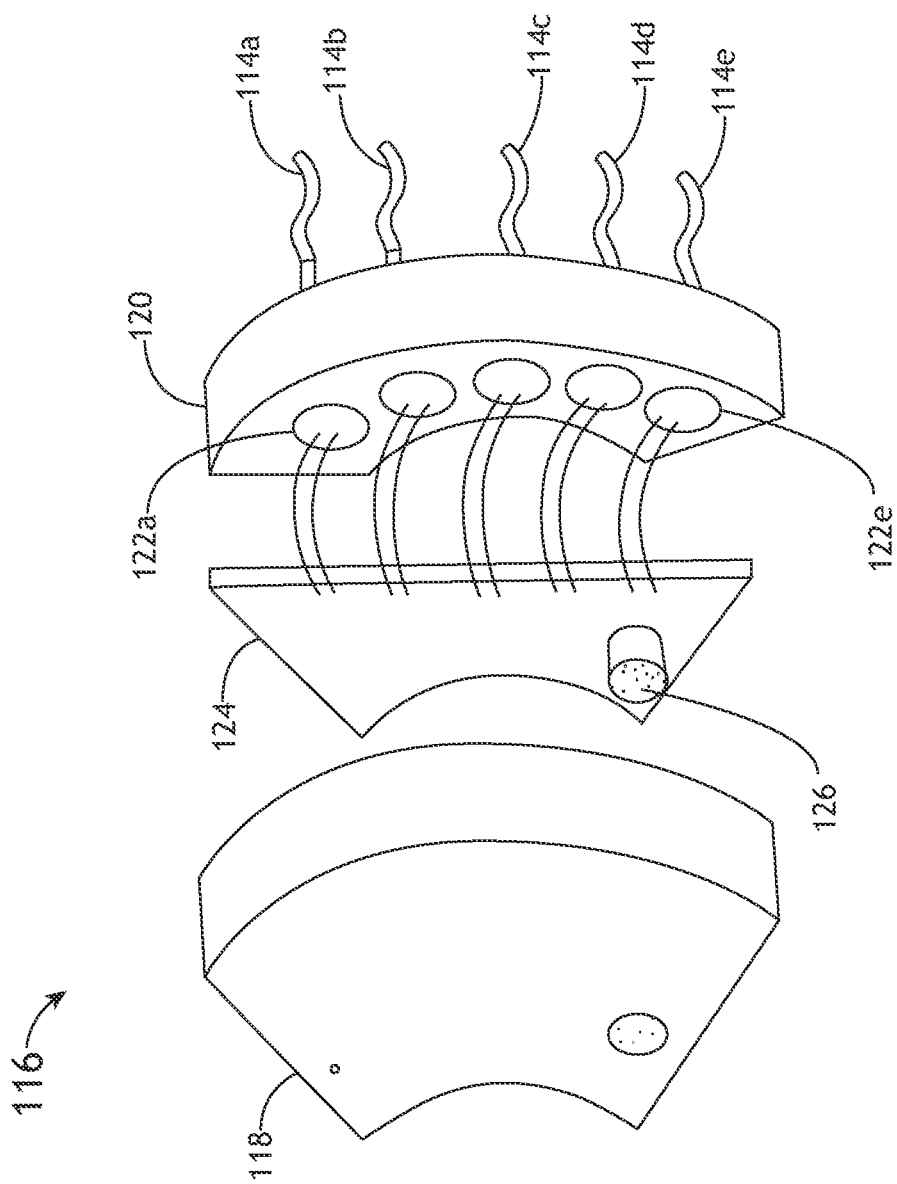
FIG. 3 is an isometric view of an air data monitoring device (ADMD) in disassembled form, in accordance with one or more embodiments of the present disclosure.

FIG. 3 is an isometric view of the ADMD 116 in disassembled form, in accordance with one or more embodiments of the present disclosure. The ADMD 116 may include a cover 118 to shield electronics. The pressure sensors 122a-e may be attached or secured to a socket holder 120. Each pitot tube 110a-e may communicate with a respective one of the pressure sensors 122a-e (e.g., using the polyurethane tubes 114a-e) to measure the ram air pressure of head-on wind. Each pressure sensor 122a-e may be electrically connected to a microcontroller-based PCB assembly 124. An ID number may be assigned to each pressure sensor 122a-e (for example, PS1, PS2, PS3, PS4, and PS5) based on the angular position (−30°/−15°/0°/+15°/+30°) of the respective pitot tube port 144a-e. The PCB assembly 124 may include an electrical connection 126 (e.g., to receive power, and to transmit AOA information to aircraft avionics computing device[s]).

Figure 4:
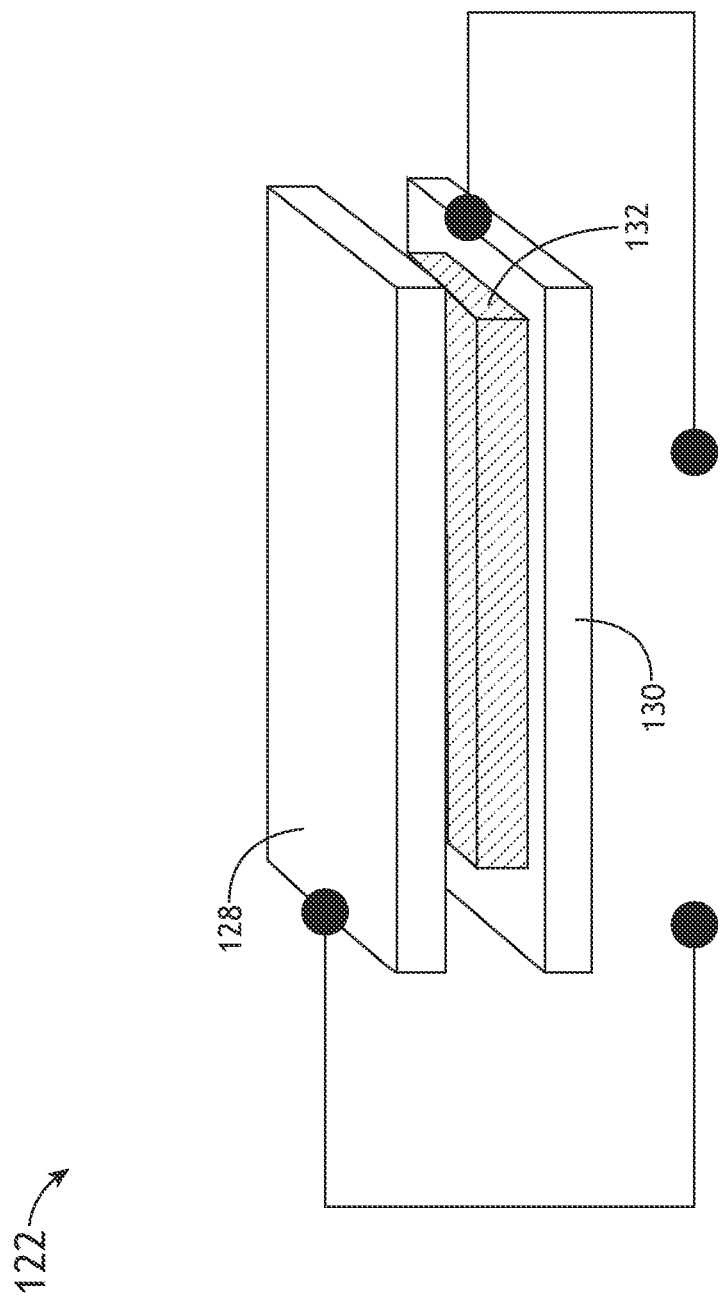
FIG. 4 is a conceptual image of a conductive elastomer pressure sensor, in accordance with one or more embodiments of the present disclosure.

FIG. 4 is a conceptual image of a conductive elastomer pressure sensor 122, in accordance with one or more embodiments of the present disclosure. The sensor 122 may include two conductive metal plates 128 and 130 and a conductive foam 132 (e.g., microcellular propylene). Pressure may be measured using a change in conductance, resistivity, or current across the metal plates 128 and 130 that are separated by the foam 132. It is noted herein that the measured ram pressure may be a total pressure measurement (e.g., without any static pressure ports). In some embodiments, the total pressure measurement may also be used to compute aircraft speed.

Figure 5:
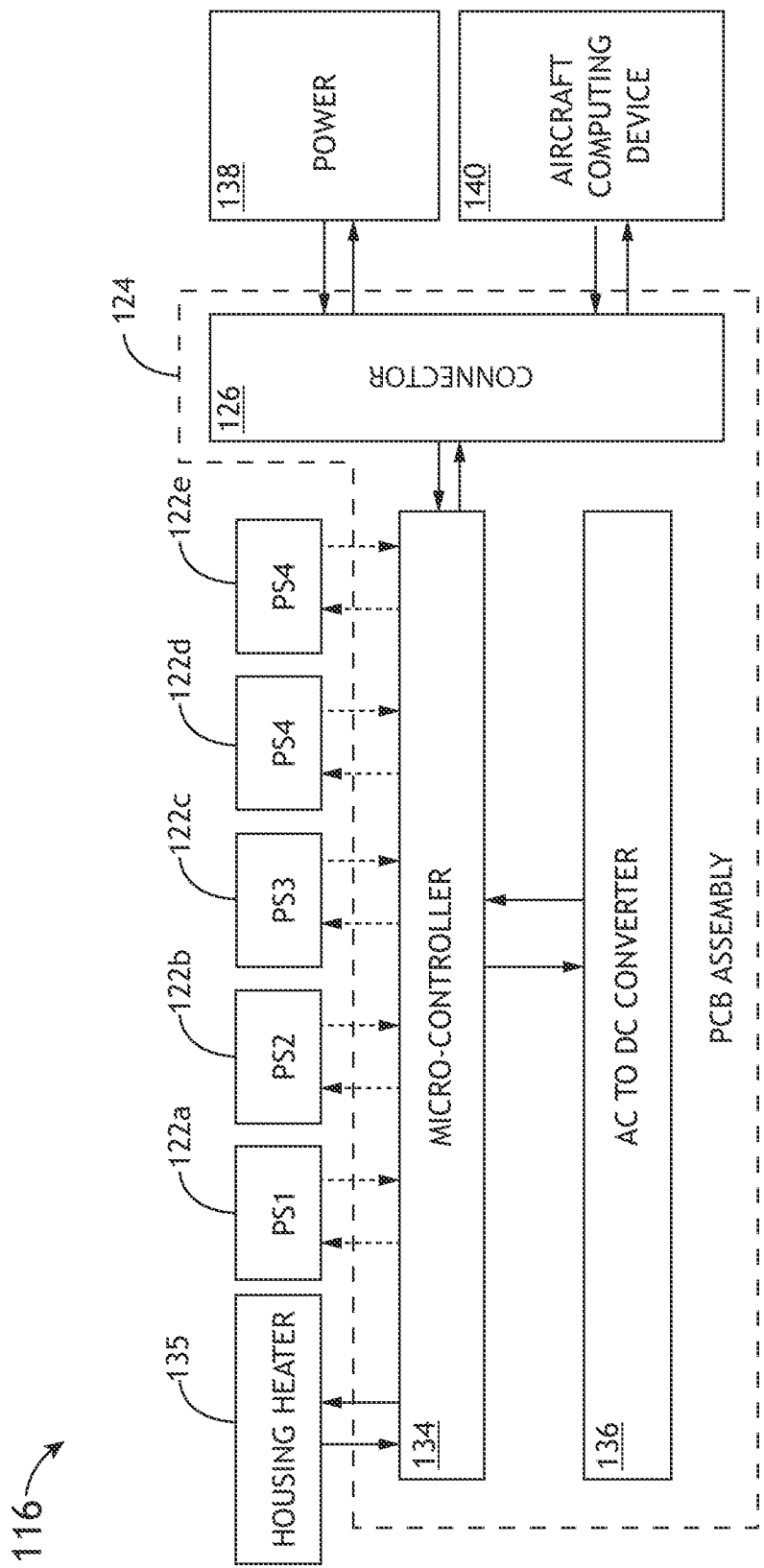
FIG. 5 is a block diagram of an ADMD, in accordance with one or more embodiments of the present disclosure.

FIG. 5 is a block diagram of the ADMD 116, in accordance with one or more embodiments of the present disclosure. The ADMD 116 may include the PCB assembly 124 including a microcontroller 134, and an AC to DC converter 136. In some embodiments, a solid-state deicing heater 135 may be electrically connected to the microcontroller 134 to heat the pitot tubes 122a-e (e.g., to avoid freezing, evaporate internal condensation, and produce reliable measurements). The PCB assembly 124 may include the electrical connection 126 to receive power 138 and transmit measured AOA values to one or more aircraft computing devices 140 (e.g., flight management system [FMS], flight surface control system, autopilot system, etc.).

The microcontroller 134 and the aircraft computing device(s) 140 may be a controller (e.g., computer or computing device) including one or more processors and a memory. For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs). In this sense, the one or more processors may include any device configured to execute algorithms and/or instructions (e.g., program instructions stored in memory), and may be configured to perform the method steps described in the present disclosure. The memory medium may include any storage medium known in the art suitable for storing program instructions executable by the associated one or more processors. For example, the memory medium may include, but is not limited to, a read-only memory (ROM), a random-access memory (RAM), a magnetic or optical memory device (e.g., hard disk), a magnetic tape, a solid-state drive and the like.

When the aircraft moves, each respective pressure sensor 122a-e may generate a respective ram air pressure measurement. However, the pressure sensor 122a-e attached to a pitot tube 110a-e having a respective pitot tube port 106a-e parallel or substantially parallel to the oncoming wind (at one of the −30°/−15°/0°/+15°/+30° angular positions) may generate a higher ram air pressure measurement compared to the other four pressure sensors 122. The pressure sensor 122a-e that measures the highest ram pressure may provide a primary current AOA value.

Additionally, each current AOA value generated by each pressure sensor 122a-e may be compared with calibrated pressure-dependent AOA values derived from calibrating each pressure sensor 122a-e at different pressures. For example, the calibrated pressure-dependent AOA values for each port 106a-e may be loaded into the memory of the microcontroller 134. The processor(s) of the microcontroller 134 may be configured to compare AOA values generated in real-time by the ports 106a-e with the calibrated pressure-dependent AOA values to generate an accurate current AOA measurement of the aircraft.

The present AOA sensor system 100 provides several advantages over conventional AOA sensors. Since only the ports 106a-e of the pitot tubes 110a-e are exposed to the atmosphere, AOA may be measured during a variety of aircraft movements (e.g., pitch, yaw, roll, cross-controlled stall, aircraft banking, etc.). If one of the ports 106a-e is blocked (e.g., by sand), AOA may still be measured by mapping the pressure values of other ports against the calibrated pre-loaded AOA data. Additionally, maintenance is simple since the system 100 has simple components. The system 100 does not include moving parts, and thus, the influence of inertial effects that decrease accuracy and increase weight and response time (as seen in vane-based sensors) is diminished. Due to the facile manufacturability and maintainability features, the present AOA sensor system 100 is highly cost effective compared to other conventional AOA sensors.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An angle of attack (AOA) sensor system comprising:
a housing attached, affixed or secured to an aircraft;
a plurality of pitot tube ports in the housing, wherein the pitot tube ports include a set of positive angle pitot tube ports, a set of negative angle pitot tube ports, and a central pitot tube port, wherein the central pitot tube port is aligned with a central chord line of a wing of the aircraft;
a plurality of pitot tubes, wherein each of the pitot tubes communicates at a first end with a respective one of the plurality of pitot tube ports;
a plurality of pressure sensors, wherein each of the pitot tubes communicates at a second end with a respective one of the pressure sensors, wherein each of the pressure sensors comprises two metal plates and a conductive foam, wherein each of the pressure sensors generates a respective ram pressure measurement;
a microcontroller communicatively coupled to the plurality of pressure sensors configured to:
generate a respective current AOA value for each pressure sensor based on the respective ram pressure measurement generated by each of the pressure sensors; and
generate an AOA measurement of the aircraft by comparing each respective current AOA value to respective calibrated AOA values stored in a memory.

2. The AOA sensor system of claim 1, wherein the pitot tube ports comprise five pitot tube ports.

3. The AOA sensor system of claim 1, wherein the set of positive angle pitot tube ports include:
a first positive angle pitot tube port at an angle of +15° with respect to the central chord line, and
a second positive angle pitot tube port at an angle of +30° with respect to the central chord line.

4. The AOA sensor system of claim 1, wherein the set of negative angle pitot tube ports include:
a first negative angle pitot tube port at an angle of −15° with respect to the central chord line, and
a second negative angle pitot tube port at an angle of −30° with respect to the central chord line.

5. The AOA sensor system of claim 1, wherein the central pitot port is aligned at an angle of 0° with respect to the central chord line.

6. The AOA sensor system of claim 1, comprising a support bracket to hold the pitot tubes.

7. The AOA sensor system of claim 1, comprising a deicing heater electrically connected to the microcontroller and configured to heat the pitot tubes.

8. The AOA sensor system of claim 1, wherein each of the pressure sensors generates a respective ram pressure measurement based on a change in at least one of a conductance, resistivity, or current across the two metal plates.

* * * * *